(12) United States Patent
Mosing et al.

(10) Patent No.: US 7,370,698 B2
(45) Date of Patent: *May 13, 2008

(54) METHOD AND APPARATUS FOR TRANSFERRING RIG WEIGHT TO TUBULARS

(75) Inventors: Donald E. Mosing, Lafayette, LA (US); Samuel P. Hawkins, III, Lafayette, LA (US); David L. Sipos, Youngsville, LA (US); Keith T. Lutgring, Lafayette, LA (US); Burney J. Latiolais, Jr., Lafayette, LA (US)

(73) Assignee: Frank's International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/512,601

(22) Filed: Aug. 29, 2006

(65) Prior Publication Data

US 2006/0283594 A1    Dec. 21, 2006

Related U.S. Application Data

(63) Continuation of application No. 10/047,727, filed on Jan. 15, 2002, now Pat. No. 7,096,948, which is a continuation of application No. 09/837,447, filed on Apr. 17, 2001, now abandoned, which is a continuation of application No. 09/206,876, filed on Dec. 8, 1998, now Pat. No. 6,279,654, which is a continuation-in-part of application No. 08/850,496, filed on May 2, 1997, now Pat. No. 5,918,673, which is a continuation-in-part of application No. 08/726,112, filed on Oct. 4, 1996, now Pat. No. 5,735,348.

(51) Int. Cl.
*E21B 33/05* (2006.01)

(52) U.S. Cl. ................. 166/177.4; 166/332.5

(58) Field of Classification Search ............... 166/380, 166/77.1, 177.4, 331.5
See application file for complete search history.

(56) References Cited

U.S. PATENT DOCUMENTS 5,735,348 A * 4/1998 Hawkins, III ............... 166/285

* cited by examiner

*Primary Examiner*—William P Neuder
(74) *Attorney, Agent, or Firm*—The Matthews Firm

(57) ABSTRACT

A multi-functional apparatus and method for drilling fluid and cementing operations to set casing in a wellbore for use on either top drive or rotary type rigs. The apparatus and method includes a fill-up and circulating tool, a cementing head assembly, a wiper plug assembly, and a push plate assembly. The fill-up and circulating tool comprises a mandrel with a sealing element disposed about the outside diameter of the mandrel. The cementing head, push plate, and wiper plug assemblies are useable on any fill-up and circulating tool capable of being inserted into a casing. To fill the casing, the assembly is lowered from the rig such that a portion of the fill-up tools inserted into the casing, the pumps are then actuated to flow fluid into the casing. To circulate fluid, the tool is lowered further such that the sealing element sealingly engages the inside diameter of the casing to allow fluid to flow through the casing, into the wellbore, and back to the fluid pumps. To utilize the push plate assembly, the push plate is rotated until attachment pins engage into corresponding J-slots and lock the plate in place. The fill-up tool is lowered so that the push plate contacts the top of the casing thus transferring the rig load onto the casing. To cement the casing, the cement pump and hose assembly is connected to the cementing head to allow cement to be pumped through the fill-up and circulating tool and into the casing string. A cement plug assembly comprising a plurality of wiper plugs is connected to the outlet of the fill-up and circulating tool. The wiper plugs are then released at a predetermined time during the cementing process to provide a positive seal at the bottom of the casing string.

8 Claims, 9 Drawing Sheets

METHOD AND APPARATUS FOR TRANSFERRING RIG WEIGHT TO TUBULARS

RELATED APPLICATIONS

This application is a continuation of U.S. patent application Ser. No. 10/047,727, filed on Jan. 15, 2002, now U.S. Pat. No. 7,096,948 which is a continuation of U.S. patent application Ser. No. 09/837,447, filed on Apr. 17, 2001 now abandoned, which is a continuation of U.S. patent application Ser. No. 09/206,876, filed on Dec. 8, 1998, now U.S. Pat No. 6,279,654 which was a continuation-in-part of U.S. patent application Ser. No. 08/850,496, filed May 2, 1997, now U.S. Pat. No. 5,918,673, which was a continuation-in-part of U.S. patent application Ser. No. 08/726,112, filed Oct. 4, 1996, now U.S. Pat. No. 5,735,348.

FIELD OF INVENTION

This invention relates generally to equipment used in the drilling and completion of subterranean wells, and more specifically to the filling and circulating of drilling fluids in a casing string as well as pumping cement into the casing to set the casing within the wellbore.

BACKGROUND

The process of drilling subterranean wells to recover oil and gas from reservoirs consists of boring a hole in the earth down to the petroleum accumulation and installing pipe from the reservoir to the surface. Casing is a protective pipe liner within the wellbore that is cemented in place to insure a pressure-tight connection to the oil and gas reservoir. The casing is run a single joint at a time as it is lowered into the wellbore. On occasion, the casing becomes stuck and is unable to be lowered into the wellbore. When this occurs, load or weight must be added to the casing string to force the casing into the wellbore, or drilling fluid must be circulated down the inside diameter of the casing and out of the casing into the annulus in order to free the casing from the wellbore. To accomplish this, it has traditionally been the case that special rigging be installed to add axial loan to the casing string or to facilitate circulating the drilling fluid.

When running casing, drilling fluid is added to each section as it is run into the well. This procedure is necessary to prevent the casing from collapsing due to high pressures within the wellbore. The drilling fluid acts as a lubricant which facilitates lowering the casing within the wellbore. As each joint of casing is added to the string, drilling fluid is displaced from the wellbore. The prior art discloses hose assemblies, housings coupled to the uppermost portion of the casing, and tools suspended from the drill hook for filling the casing. These prior art devices and assemblies have been labor intensive to install, required multiple such devices for multiple casing string sizes, have not adequately minimized loss of drilling fluid, and have not been multi-purpose. Further, disengagement of the prior art devices from the inside of the casing has been problematic, resulting in damage to the tool, increased downtime, loss of drilling fluid, and injury to personnel.

The normal sequence for running casing involves suspending the casing from a top drive or non-top drive (conventional rotary rig) and lowering the casing into the wellbore, filling each joint of casing with drilling fluid. The filling of each joint or stand of casing as it is run into the hole is the fill-up process. Lowering the casing into the wellbore is facilitated by alternately engaging and disengaging elevator slips and spider slips with the casing string in a stepwise fashion, facilitating the connection of an additional stand of casing to the top of the casing string as it is run into the hole.

Circulation of the fluid is sometimes necessary if resistance is encountered as the casing is lowered into the wellbore, preventing the running of the casing string into the hole. This resistance to running the casing into the hole may be due to such factors as drill cuttings, mud cake, or surface tension formed or trapped within the annulus between the well bore and the outside diameter of the casing, or caving of the wellbore among other factors. In order to circulate the drilling fluid, the top of the casing must be sealed so that the casing may be pressurized with drilling fluid. Since the casing is under pressure the integrity of the seal is critical to safe operation, and to minimize the loss of expensive drilling fluid. Once the obstruction is removed the casing may be run into the hole as before.

Once the casing reaches the bottom, circulating of the drilling fluid is again necessary to test the surface piping system, to condition the drilling fluid in the hole, and to flush out wall cake and cuttings from the hole. Circulating is continued until at least an amount of drilling fluid equal to the volume of the inside diameter of the casing has been displaced from the casing and wellbore. After the drilling fluid has been adequately circulated, the casing may be cemented in place.

On jobs which utilize a side door elevator, the casing is simply suspended from a shoulder on the elevator by the casing collar. Thus, fill-up and circulation tools with friction fit sealing elements such as packer cups, and other elastomeric friction fit devices must repeatedly be inserted and removed because of the overall length requirements of the tool. This repeated insertion will, over time, result in the wearing of the elastomeric sealing element such that it will no longer automatically seal on insertion. An adjustable extension is disclosed, which allows the fill-up and circulation tool to be retracted to prevent the elastomeric seal from being inserted into the casing during the fill-up process.

Circulation alone may be insufficient at times to free a casing string from an obstruction. The prior art discloses that the fill-up and circulation tools must be rigged down in order to install tool assemblies to attach to the rig to allow the string to be rotated and reciprocated. This process requires manual labor, inherent in which is the possibility of injury or loss of life, and results in rig downtime. The potential for injury and lost rig time is a significant monetary concern in drilling operations. To eliminate his hazard and minimize lost rig time, a method and apparatus is disclosed, which allows the fill-up and circulation tool to remain rigged up while at the same time allowing the casing to be rotated and reciprocated.

After the casing has been run to the desired depth it may be cemented within the wellbore. The purpose of cementing the casing is to seal the casing to the wellbore formation. In order to cement the casing within the wellbore, the assembly to fill and circulate drilling fluid is generally removed from the drilling rig and a cementing head apparatus installed. This process is time consuming, requires significant manpower, and subjects the rig crew to potential injury when handling and installing the additional equipment flush the mud out with water prior to the cementing step. A special cementing head or plug container is installed on the top portion of the casing being held in place by the elevator. The cementing head includes connections for the discharge line of the cement pumps, and typically includes a bottom wiper plug and a top wiper plug. Since the casing and wellbore are full of drilling fluid, it is first necessary to inject a spacer fluid to segregated the drilling fluid from the cement to follow. The cementing plugs are used to wipe the inside diameter of the casing and serves to separate the drilling fluid from the cement, as the cement is carried down the casing string. Once the calculated volume of cement required to fill the annulus has been pumped, the top plug is released from the cementing head. Drilling fluid or some other suitable fluid is then pumped in behind the top plug, thus transporting both plugs and the cement contained between the plugs to an apparatus at the bottom of the casing known as a float collar. Once the bottom plug seals the bottom of the casing, the pump pressure increases, which ruptures a diaphragm in the bottom of the plug. This allows the calculated amount of cement to flow from the inside diameter of the casing to a certain level within the annulus being cemented. The annulus is the space within the wellbore between the ID of the wellbore and the OD of the casing string. When the top plug comes in contact with the bottom plug, pump pressure increases, which indicates that the cementing process has been completed. Once the pressure is lowered inside the casing, a special float collar check valve closes, which keeps cement from flowing from the outside diameter of the casing back into the inside diameter of the casing.

The prior art discloses separate devices and assemblies for (1) filling and circulating drilling fluid, and (2) cementing operations. The prior art devices for filling and circulating drilling fluid disclose a packer tube, which requires a separate activation step once the tool is positioned within the casing. The packer tubes are known in the art to be subject to malfunction due to plugging, leaks, and the like, which lead to downtime. Since each step in the well drilling process is potentially dangerous, time consuming, labor intensive and therefore expensive, there remains a need in the art to minimize any down time. There also remains a need in the art to minimize tool change out and the installation of component pieces.

Therefore, there remains a need in the drilling of subterranean wells for a tool which can be used for drilling fluid, filling and circulating, and for cementing operations.

For the foregoing reasons, there is a need for a drilling fluid filling, circulating, and cementing tool which can be installed quickly during drilling operations.

For the foregoing reasons, there is a need for a drilling fluid filling, circulating, and cementing tool which seals against the inside diameter of a casing having a self-energizing feature.

For the foregoing reasons, there is a need for a drilling fluid filling, circulating, and cementing tool which minimizes the waste of drilling fluids and allows for the controlled depressurization of the system.

For the foregoing reasons, there is a need for a drilling fluid filling, circulating, and cementing tool which may be used for every casing size.

For the foregoing reasons, there is a need for a drilling fluid filling, circulating, and cementing tool which submits additional axial loads to be added to the casing string when necessary.

For the foregoing reasons, there is a need for a drilling fluid filling, circulating, and cementing tool which is readily adjustable in length such that damage to the sealing element is minimized.

For the foregoing reasons, there is a need for a fill-up and circulating tool which may be sealingly coupled to a casing string to allow the string to be rotated and reciprocated into the wellbore.

SUMMARY

The present invention is directed to a method and apparatus that satisfies the aforementioned needs. A drilling fluid filling, circulating and cementing tool having features of the present invention may be utilized on rigs with top drive drilling systems and conventional rotary type rig configurations. The tool may be quickly and easily installed in a top drive or a rotary type rig arrangement. The fill-up and circulating tool of the present invention includes a mandrel having a central axial bore extending therethrough. A top sub assembly which includes a series of threaded couplings and spacers that may be threadedly connected to the upper end of the mandrel to provide proper spacing of the tool within the rigging apparatus. The lowermost portion of the mandrel may include a plurality of apertures which allows drilling fluid to flow from the bore and through the apertures during drilling fluid circulating. A lock sleeve is disposed about the outside diameter of the mandrel, and is positioned to cover the mandrel apertures during the fill-up mode of operation. A retaining spring may be disposed on the outside diameter of the mandrel to bias the lock sleeve between the fill up and circulating positions. An inverted packer cup may be fixedly connected at one end to the outside diameter of the lock sleeve. The opposite end of the cup extends radially outward and away from the outside diameter of the lock sleeve and is adapted to automatically seal against the inside diameter of the casing string when the cup is inserted into the casing. A mud saver valve and nozzle assembly may be connected to the lower end of the mandrel. The mud saver valve is actuated to the open position by increased fluid pressure from above and regulates the flow of fluid from the tool. A nozzle may be attached to the outlet of the mud saver valve to facilitate entry of the tool into the top of the casing string. This configuration is commonly used in a top drive configuration. When the tool is used in a rotary type configuration, a bayonet adapter may be installed on the inlet of the mandrel and is adapted such that fluid may be pumped directly to the tool. The tool may also be configured in a cementing and drilling fluid fill up and circulating arrangement. The cementing and drilling fluid fill up and circulating arrangement includes a cementing head assembly connected to the top of the mandrel. This configuration allows the tool to first be used for drilling fluid fill up and circulating, and then by simply removing the mud saver valve and nozzle and installing the cement wiper plug assembly, common cementing operations may begin for cementing the casing in place. The fill-up and circulating tool of the present invention as well as other such tools, which are capable of being inserted into casing may be configured with a push plate assembly to transfer the weight of the rotary rig assembly and/or top drive to the casing string in order to force the string into the wellbore.

According to the method of the present invention, when the assembly is utilized for drilling fluid fill up within the casing string, the assembly is first installed on the top drive or rotary type unit and then positioned above the casing to be filled. In on embodiment, the assembly is then lowered until the hose extension is inside of the upper end of the casing string, without engaging the sealing cup with the inside of the casing. In this position the lowermost portion of the mandrel maybe covered by the lock sleeve. The drilling fluid pumps may then be started, which causes the drilling fluid to flow through the assembly and upon generating sufficient fluid pressure will flow through the mud saver valve and out of the nozzle into the casing.

If a side door elevator is used to raise and lower the casing, full-up and circulation tools which utilize packer cups or other elastomeric friction fit devices must repeatedly be inserted and removed because of the overall length requirements of the tool. A side door elevator is generally used when relatively short strings of casing are being run. The side door elevator does not have slips to engage with the casing string. The side door elevator in the open positions lowered axially over the upper end of the casing string such that the elevator shoulder is underneath the casing collar. The side door elevator is then closed and the top of the side door elevator shoulder is engaged against the bottom surface of the casing collar thereby suspending the casing string from the side door elevator. The problem associated with the use of this type of elevator is the reduced life of the packer cup or elastomeric friction fit sealing device due to wearing against the inside diameter of the casing string. Since the side door elevator is close coupled with the casing collar, due to the required spacing of the fill-up and circulating tool, the packer cup or elastomeric sealing device is always inserted into the casing whether in the fill-up or circulating mode as each joint of casing is added to the string, resulting in repeated frictional engagement of the sealing device with the smaller inside diameter of the casing string.

The packer, whether a cup or other elastomeric device, wearing problem also occurs when the fill-up and circulation tools is in the tandem configuration. The tandem configuration comprises the use of two different sizes of packer cups or elastomeric sealing devices on a single fill-up and circulation tool to allow different casing sizes to be run without stopping to re-tool. The normal spacing of the tool in the fill-up mode is to position the tool such that the packer is approximately one (1) foot above the top of the casing string. This is not a problem when running smaller casing since both packer cups or elastomeric devices are above the casing. However, when larger diameter casing is run, the lower (smaller diameter) packer cup or elastomeric device is inserted into the casing string such that the upper (larger diameter) packer cup or elastomeric device is approximately 1 foot above the top of the casing string.

The present invention solves the problems associated with the repeated insertion of a packer cup or elastomeric sealing device into the casing string. An adjustable extension for the fill-up and circulation tool is included, which allows the tool to be retracted to a length such that the sealing devices remain above and outside of the casing string during the fill-up step.

To begin the drilling fluid circulation mode, the assembly is lowered further into the casing string to cause the sealing element to automatically engage and seal against the inside diameter of the casing, which generally fixes the sealing device cup and sliding sleeve in place with respect to the casing. Further lowering of the assembly causes the mandrel to move axially downward resulting in the mandrel apertures being exposed from the sliding sleeve. On sufficient fluid pressure from the pumps, fluid exits from the tool into the casing through the apertures and through the nozzle. Continued flow of fluid through the tool and into the casing pressurizes the drilling fluid and on sufficient pressurization causes the fluid to circulate from the inside diameter of the casing into and out of the annulus to free or dislodge the casing from the wellbore.

On occasion circulation alone will not suffice to get past a down hole obstruction. Under these circumstances rotation of the casing string, and/or reciprocation of the casing string may be required to "spud" the casing into the hole. The prior art fill-up and circulation tools had to be rigged down to allow a pup piece or other similar means to be attached to the top drive rig or rotary sub to allow the string to be reciprocated and rotated past the obstruction. The rigging of the fill-up and circulating tools down and up again as well as rigging up and down with the pup piece consumes considerable man-hours and rig time. The present invention offers a solution to this problem. A torque sub in combination with the fill-up and circulation tool is provided, which allows the operator to simply make-up with the coupling on the upper end of the casing with the fill-up and circulation tool remaining connected to the top drive (or rotary sub). To make-up with the casing, the spider slips are engaged against the casing fixing it in position. The elevator slips are disengaged from the casing and the top drive unit is lowered axially over the upper end of the casing to allow the threads on the torque coupling to engage with the threads on the casing coupling. The top drive is simply actuated to rotate the fill-up and circulation tool until the torque sub is threadedly connected to the casing coupling. The operator may not pick-up on the casing string to disengage the spider slips. By placing the weight of the top drive onto the casing, the entire string can then be rotated and reciprocated. The casing can then be lowered further into the wellbore. Once the casing is lowered such that the elevator is in contact with the spider, the bails can be disconnected to allow the top sub to lower the casing even further into the wellbore. The spider slips are then engaged against the casing to fix it at the rig floor. The top drive is simply reversed to disengage the torque sub from the casing coupling, and the bails may be reconnected to the elevator, or if further reciprocation is necessary left uncoupled. Now another joint of casing can be picked up to make up the joint with the casing.

When the casing is run to the desired depth and drilling fluid filling and circulation is no longer required, the assembly may be configured for the cementing process. The drilling fluid lines are disconnected and replaced with the cement pump lines. After the drilling fluid flow is stopped, the apparatus is withdrawn from the casing to expose the mud saver valve and hose extension assembly. The mud saver valve and hose extension assembly may be simply uncoupled from the lower body of the apparatus and the cement wiper plug assembly installed. The apparatus with the cement plug assembly and cement pump lines installed is then lowered back into the casing. Once the sealing device is automatically engaged with the casing the cementing process begins. The plug release mechanism may be initiated at the appropriate times during the cementing process to release the cement wiper plugs.

The fill up and circulating tool of the present invention may include a mandrel having an axial bore formed therethrough, a sealing element disposed about the mandrel, and a pressure relief housing functionally connected with the mandrel for allowing fluid to flow from the casing into the tool when the pressure in the casing is greater then the pressure in the axial bore. The pressure relief housing may include a lateral port or aperture formed therethrough. The relief housing may further include a blocking mechanism for such as an elastomeric member or ball and seat for allowing fluid to flow into the tool from the wellbore and preventing fluid flow through the port into the wellbore.

The present invention may be utilized on top-drive and rotary type rigs. Unlike the prior art devices, this invention permits the same basic tool to be utilized for all casing diameters. The only difference is in the choice of sealing device assembly diameters. Thus, the necessity of having multiple tools on hand for multiple casing diameters is eliminated. This feature is much safer, saves rigging time as well as equipment rental costs for each casing installation. The same basic assembly may be used for cementing the casing within the wellbore, saving again on rigging time and equipment rental. In addition, the assembly may be configured for drilling fluid fill up and circulating only. The prior art does not disclose a single assembly, which may be employed to fill-up and circulate drilling fluid, pressure test casing, and fill-up and circulate cement to set the casing in place.

DETAILED DESCRIPTION

Figure 1:
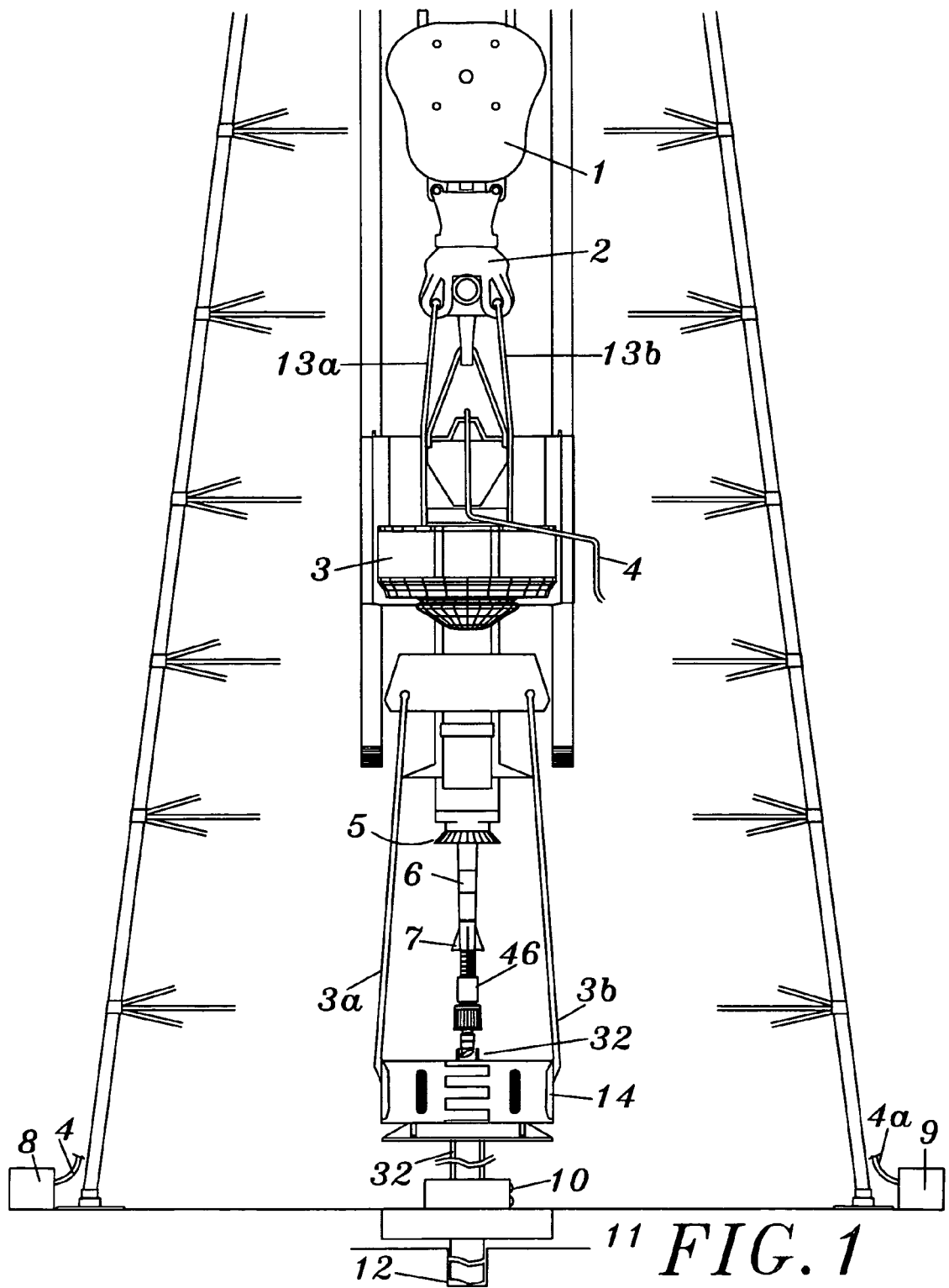
FIG. 1 Shows a top drive rig assembly in accordance with the present invention.

FIG. 1 shows a top drive drilling rig 3. FIG. 1 also shows the casing fill up and circulator tool 46 in the top drive configuration, which is more fully described below. Those skilled in the art will know that suspended from the traveling block 1 on a drilling rig is a hook 2. The top drive unit 3 is suspended from the hook 2. Pressurized fluid is delivered from the drilling fluid pumps 8 through hose 4 directly to the top drive unit 3. A top sub box connection assembly 6 is threadedly connected at one end to the top drive pin shoulder 5 to receive the fill up and circulating tool 46. The opposite end of the top sub box connection assembly is threadedly connected to the casing fill up and circulating tool 46. A tool catch plate 7 may be fixed to the top sub box connection assembly 6 as a stop which will engage against the uppermost portion of the casing if the tool becomes disengaged from the top drive unit 3. An elevator 14 is suspended from bails 3a and 3b attached to the top drive unit 3. It should be obvious to one skilled in the art that a joint of casing 32 may be positioned under the top drive unit so as to allow the upper end of the casing to be gripped by the elevator 14, thereby inserting the fill up and circulating tool 46 partially inside of the casing 32. The casing 32, suspended from the elevator 14 may then be lowered through the rotary table slips 10 on the drilling rig floor and rotary table 11 below the rig floor and into the wellbore 12. As the casing 32 is being lowered it may be filled with drilling fluid from the fill up and circulating tool 46, the full operation of which is more fully described below. Once the casing 32 is lowered such that the elevator 14 is almost in contact with the rotary table slips 10, the slips 10 are then engaged against the casing 32 to hold it in position above the rig floor to receive the next joint of casing 32. The procedure is repeated until the entire casing string has been lowered into the wellbore 12.

Figure 2:
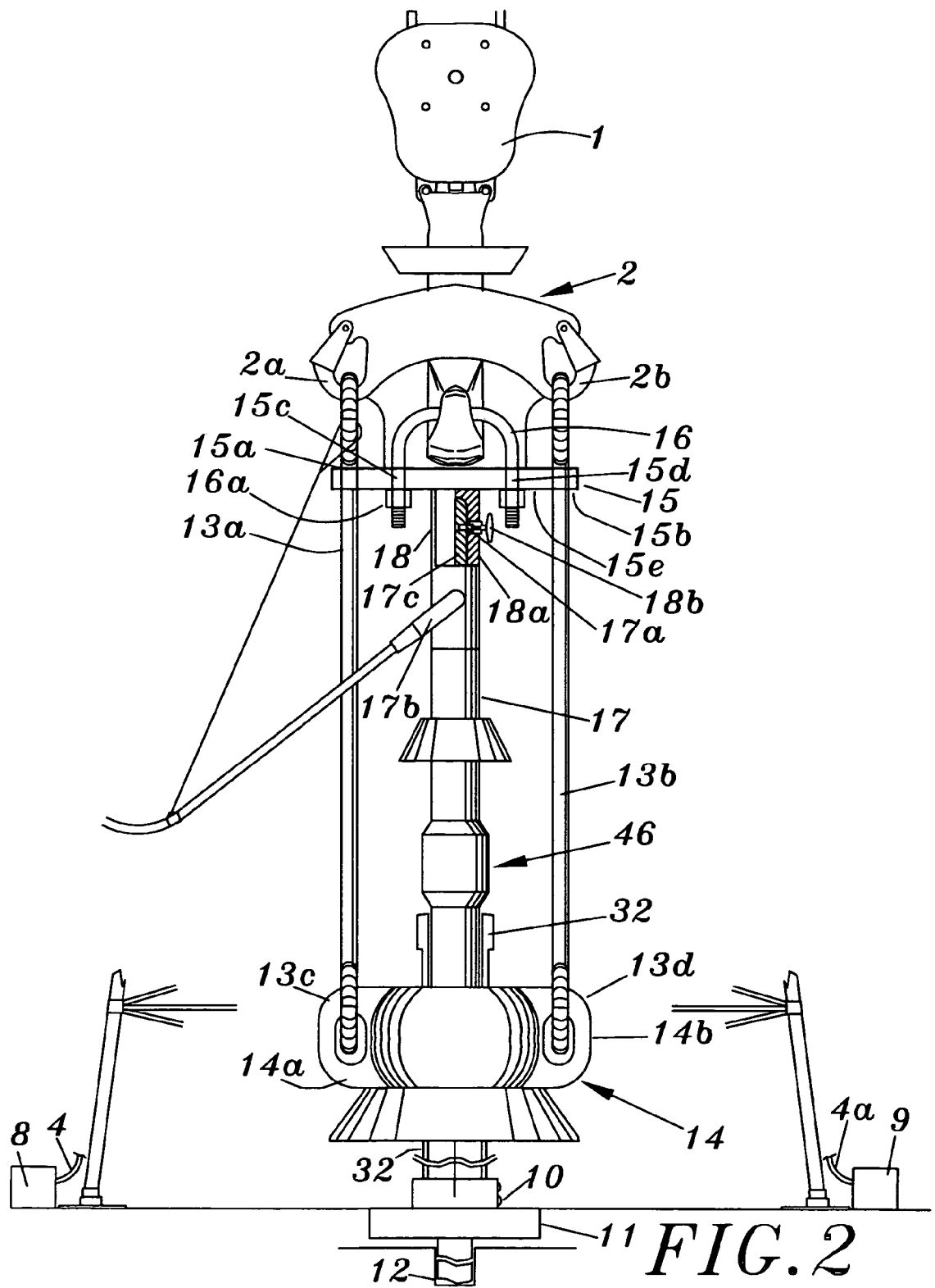
FIG. 2 Shows a conventional rotary rig assembly used in accordance with the present invention.

FIG. 2 is illustrative of a conventional drilling rig with a rotary type rig assembly with the casing circulating tool installed 46. Those skilled in the art will know that suspended from the traveling block on a rotary type rig configuration is a hook 2. The hook 2 includes two ears 2a and 2b, located on either side of the hook 2, and are used to suspend a pair of bails 13a and 13b and an elevator 14 below. The lower end of the bails 13a and 13b are connected to the ears 14a and 14b of the elevator 14. The hook 2, also suspends a guide plate 15 connected by a U-bolt 16, which is secured to the guide plate 15 with nuts 16a and 16b. The U-bolt 16 extends through apertures 15c and 15d in the guide plate 15. The bails 13a and 13b extend through two apertures 15a and 15b in the guide plate 15 such that horizontal movement of the bails 13a and 13b, the elevator 14, and the fill up and circulating tool 46 is limited. The lock block 18 having a central axial bore is welded at one end to the bottom surface 15e of the guide plate 15. The lock block 18 includes at least one aperture 18a extending through the wall of the lock block 18 to receive spring pin 18b. Spring pin 18b is adapted to releasably extend through the lock block aperture 18a and to engage the channel 17a in the upper end of the bayonet adapter 17 on the fill-up and circulating tool 46. The spring pin 18b is inserted through the aperture 18 and into the channel 17a to retain the bayonet adapter 18 within the lock block 18 thereby suspending the fill-up and circulating tool 46 from the guide plate 15. To deliver fluid to the casing, the drilling fluid pump 8 is activated which discharges drilling fluid into hose 4, and into the fill-up and circulating tool through the nozzle 17b on the bayonet adapter 17, which transports the drilling fluid to the fill-up and circulating tool 46 and into the casing 32. Alternative embodiments of the lock block and bayonet adapter are contemplated by the present invention. For example, lock block 18 comprises a cylinder with internal threads and the bayonet adapter with a male threaded end so as to be threadedly connected to the lock block. In a second alternative embodiment, lock block 18 comprises a cylinder with two apertures extending through the wall of the cylinder 180 apart with the cylinder having an outside diameter slightly smaller than the inside diameter of the lock block. The upper end of the bayonet adapter is inserted inside the lock block with the apertures in alignment. A pin would then be inserted through the apertures to retain the bayonet adapter and therefore the fill-up and circulation tool.

Figure 3:
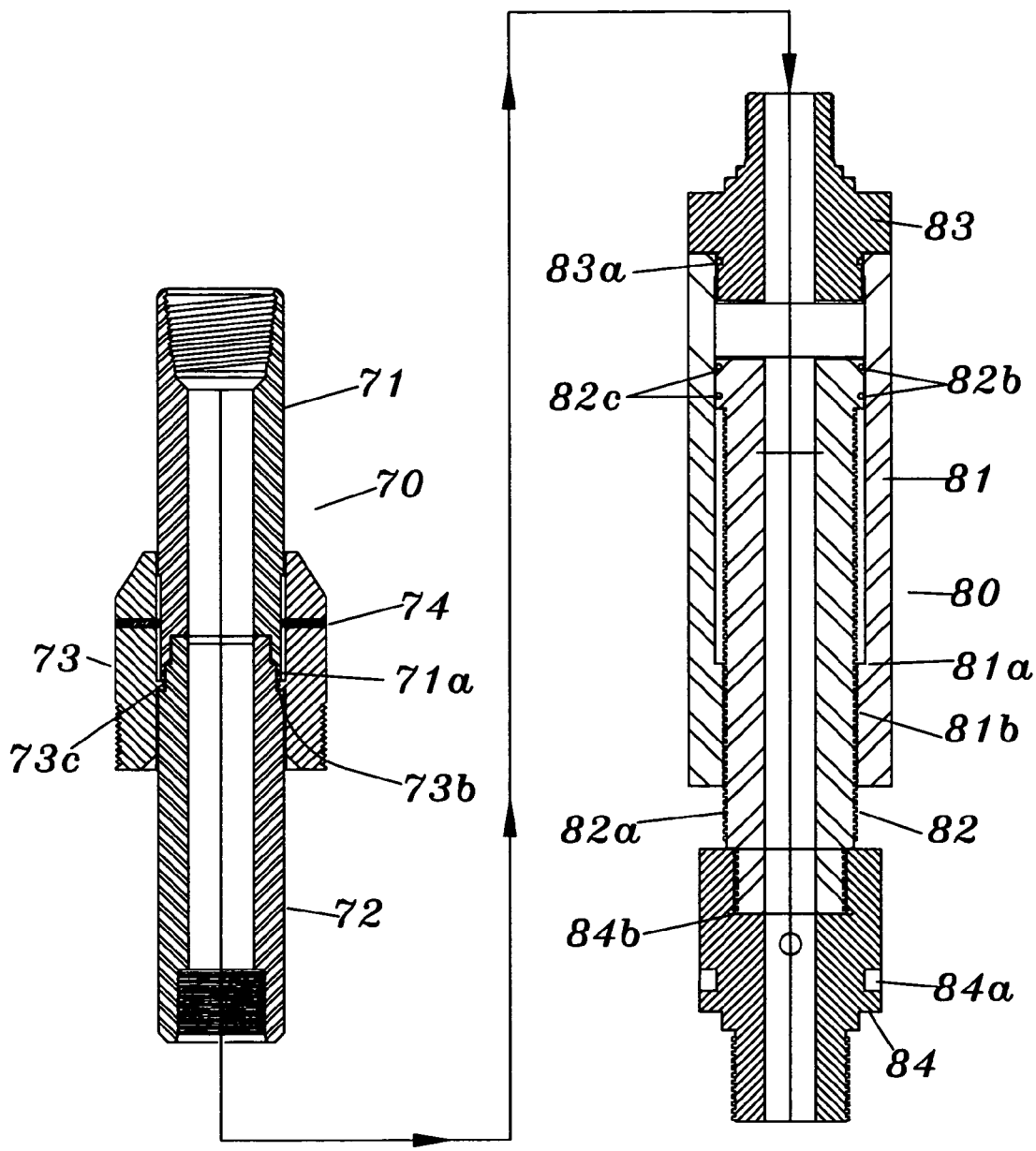
FIG. 3 Shows a side view of the torque sub and the adjustable extension.

FIG. 3 is illustrative of a torque sub 70 and a rotational sub 80, both or either of which may be used in combination with any fill-up and circulation tool inerrable within a casing string in either a top drive or conventional rotary rig configuration. The torque sub 70, the operation and benefits of which are described above, includes three primary components, a top sub 71, a lock sub 72 and a thread adapter 73. The inlet of top sub 71 is threadedly connected to the top drive 3 (or rotary sub if a conventional rotary rig is used). The outlet of the top sub 71 is threadedly connected to the inlet of lock sub 72. The outlet of lock sub 72 may then be connected directly to the fill-up and circulation tool selected, or it may be connected to the adjustable extension 80. The outlet of top sub 71 also includes O-ring 71a which provides a fluid tight seal against the inlet of lock sub 72. Disposed about the lower outer surface of the top sub 71 and the upper outer surface of the lock sub 72 is thread adapter 73. Thread adapter 73 includes external threads 73a, which allows the assembly to be threadedly connected to the internal threads of a casing coupling. Thus, it will be obvious to one skilled in the art that the outside diameter of the thread adapter 73 varies with the inside diameter of the particular casing and therefore casing coupling used. Extending from the inside wall of the thread adapter is a shoulder 73b, which is in engaging contact with the outside wall on the outlet portion of the lock sub 72. Disposed within shoulder 73b is an O-ring 73c, which provides a fluid tight seal between thread adapter 73 and lock sub 72. Extending laterally through the wall of thread adapter 73, near its upper end, are pins 74. In the preferred embodiment, four (4) pins 74 are located approximate 90° apart. Pins 74 extend past the inside surface of the wall of thread adapter 73 and extend through a slot 71b in the lower end of top sub 71 such that the end of the pins 74 engage against the wall of the top sub. This fixes thread adapter 73 to top sub 71. It will now be obvious that as the assembly is rotated by top drive 3 (or rotary sub) to thread adapter 73 into the casing coupling, the assembly rotates as a unitary structure. After thread adapter 73 and the casing coupling have been made-up, elevator 14 and spider 10 (FIGS. 1 and 2) may be released allowing the entire casing string to be rotated and/or reciprocated within the wellbore. Since fill-up and circulation tool 46 is still attached, fluid circulation may be performed as well.

FIG. 3 also shows the adjustable extension 80, the benefits and general operation of which is described above. The adjustable extension 80 allows a fill-up and circulation tool of any design to be extended and retracted automatically via the top drive 3 (or a rotary sub) or manually by simply rotating the adjustable extension 80 in the desired direction. The adjustable extension 80 may be used in place of or in addition to the top sub assembly or pup piece typically used to space the particular fill-up and circulation tool out on the rig. The adjustable extension 80 includes a lower adapter 84, an upper adapter 83, a screw mandrel 82, and an extension housing 81. The inlet of the upper adapter 83 includes threads to connect to a torque sub 70, a cement head assembly (see FIG. 5), or may be connected to the top drive or rotary rig. The outlet of the upper adapter 83 is threadedly connected to the upper end of extension housing 81. An O-ring 83a is disposed within the lower outer wall of the outlet of the upper adapter 80 to provide a fluid tight seal between the extension housing 81 and the upper adapter 83. The lower end of the extension housing 81 includes a shoulder 81a, after which threads 81b on the inside wall extend to the end of the extension housing 81. Threadedly connected to the lower end of the extension housing 81 is screw mandrel 82. The screw mandrel 82 includes threads 82a substantially along the length of the screw mandrel 82 so that when the extension assembly is rotated, the screw mandrel moves axially within the extension housing 81 allowing the tool to be extended or retracted as the need arises. The upper end of the screw mandrel 82 includes a flange 82b, the lower portion of which engages against the shoulder 81a of the extension housing 82 to create a stop when the extension assembly 80 is fully extended. The upper portion of the flange 82b engages against the outlet of the upper adapter 83 to create a stop when the extension assembly 80 is fully retracted. Disposed within the outer wall of the shoulder 81a are O-rings 82c, which provide a fluid tight seal between the screw mandrel 82 and the extension housing 81. Threadedly connected to the outlet of the screw mandrel 82 is the inlet of the lower adapter 84. Disposed within the inside wall of the inlet of the lower adapter is an O-ring 84b, which provides a fluid tight seal between the screw mandrel 82 and lower adapter 84. The outlet of lower adapter 84 is threadedly connected to fill-up and circulation tool 46, the cement head assembly 47, the torque sub 70 or other related assembly as the circumstances dictate. At least one slot 84a is disposed in the outer wall of the lower adapter 84. In order to retract or extend the adjustable extension 80, a bar or other suitable member is inserted into the slot and force is applied to the bar to extend or retract the adjustable extension 80 manually. In order to extend or retract the extension automatically, a bar or other suitable member of sufficient length to engage with the bails when rotated is inserted into the slot. Thus, it will be obvious to one skilled in the art that once the top drive 3 (or rotary sub) is activated to rotate, the bar will move along with the lower adapter 84 until the bar engages against the bail. Further rotation will cause the extension assembly 80 to be retracted or extended.

Figure 3A:
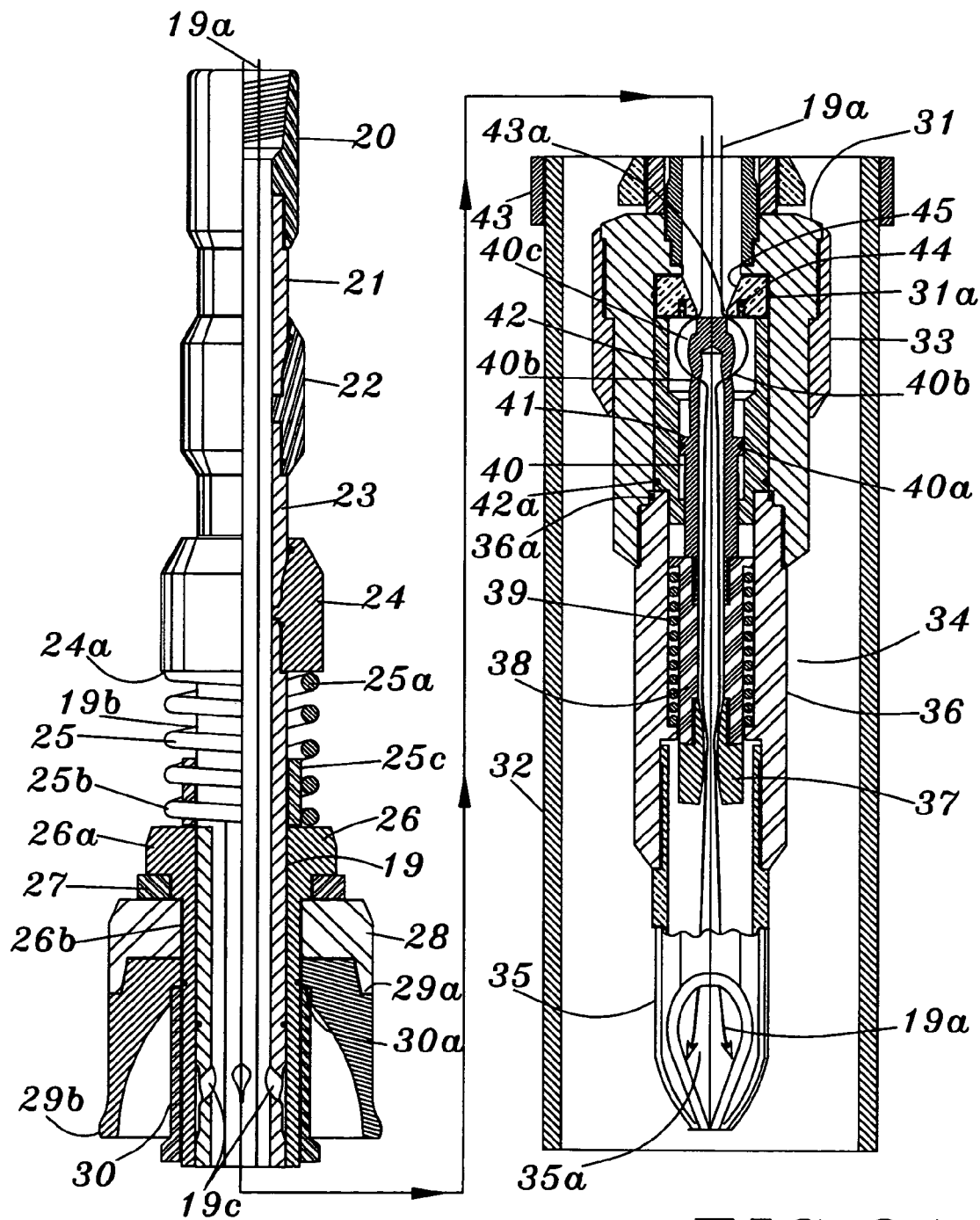
FIG. 3a Shows a side view of the fill up and circulating tool in the fill-up mode and configured for a top drive rig assembly.

FIG. 3a shows the preferred embodiment of fill-up and circulating tool 46 in the top drive configuration and in the fill-up position. Those who are skilled in the art will know and understand that each component in the flow path includes an inlet and an outlet. The tool consists of a mandrel 19, having a central axial bore defining a flow path 19a through which fluid flows through the tool. A plurality of apertures 19c located near the outlet of mandrel 19 allow fluid to flow through apertures 19c during the circulating mode of tool 46 as more fully described below. To lengthen mandrel 19 to space out the tool in any desired length on the rig, a top sub assembly may be connected to the inlet of mandrel 19. The top sub assembly may consist of a top sub 20, a first spacer 21, a connector coupling 22, a second spacer 23, and a top collar 24 connected in series thereby extending the overall length of the tool as well as the flow path 19a. Any number of couplings and spacers or length of spacer may be used to provide proper spacing on the top drive or conventional rotary rig configuration. Once the spacing requirements have been determined, the top sub assembly is configured with top collar 24 connected to the inlet of mandrel 19.

A spring 25 is disposed about the outer surface 19b of mandrel 19. The upper end 25a of spring 25 is in engaging contact with and below lower surface 24a of top collar 24. A sliding sleeve 26 in engaging contact with the lower end 25b of the spring 25 is disposed about the outer surface 19b of the mandrel 19. A spring stop 25c is disposed within the annular space between spring 25 and outer surface 19b of mandrel 19. Spring stop 25c is included to prevent spring 25 from being damaged from excessive compression. Spring 25 biases sliding sleeve 26 such that in the fill-up mode of tool 46, sliding sleeve 26 covers the mandrel apertures 19c, which results in fluid flow exclusively through the outlet of mandrel 19.

The upper end of sliding sleeve 26 includes a flange portion 26a, the upper surface of which is in engaging contact with lower end 25b of spring 25, and the lower surface of which is in engaging contact with a spacer ring 27. The lower surface of spacer ring 27 is in engaging contact with a thimble 28. Thimble 28 is adapted to retain the upper end 29a of the sealing element, packer cup 29 which may be any type of elastomeric sealing device, against and between the lower surface of thimble 28 and the outer surface of sliding sleeve 26 near the upper end 26b. While packer cup 29 is shown as the preferred embodiment of the sealing element, any friction fit sealing device may be used, as well as other sealing devices such as inflatable packers and the like may be used in combination with the features and benefits of sliding sleeve 26 and the mandrel 19 described herein.

Spacer ring 27 minimizes the potential for deflection of thimble 28 when subjected to fluid pressure forcing packer cup 29 and thimble 28 upward and outward. A lock sleeve 30 is disposed about the sliding sleeve 26 and is connected to the lower end 26b of sliding sleeve 26. The upper end 30a of lock sleeve 30 is in engaging contact with the upper end 29a of packer cup 29 to further retain packer cup 29 within thimble 28 and against the outer surface 26b of sliding sleeve 26. Packer cup 29 depends downward with respect to the upper end 29a of packer cup 29, flaring radially outward and away from sliding sleeve 26 such that it forms a cone which defines an annular space between the inside surface of packer cup 29 and sliding sleeve 26. The outside diameter of the lower end 29b of packer cup 29 is at least equal to the inside diameter of casing 32. The lower end 29b is further adapted to be inserted into casing 32 and upon insertion to automatically engage with and to provide a leak tight seal against the inside diameter of casing 32. Packer cup 29 is formed from a flexible elastomeric material such as rubber, however other materials or combination of materials are contemplated by the present invention. For example, in an alternative embodiment, the upper end 29a of packer cup 29 is made of steel while the lower end 29b is made of rubber or some other elastomer.

The outlet of mandrel 19 is connected to the inlet of a lower body 31. The lower body 31 limits the travel of sliding sleeve 26 downward. In the fill-up mode of tool 46, spring 25 biases sliding sleeve 26 downward such that the bottom surface of the sliding sleeve 26 is in engaging contact with the top surface of lower body 31. Lower body 31 also provides a conduit connection between mandrel 19 and mud saver valve 34. A guide ring 33 is connected to and disposed about the outer surface of the lower body 31. The guide ring 33 serves as a guide to center tool 46 within casing 32 as it is lowered. The outlet of lower body 31 is threadedly connected to a mud-saver valve and nozzle assembly.

The mud saver valve and nozzle assembly includes a mud saver valve 34, and a nozzle 35. The preferred embodiment comprises a mud saver valve 34 having threads on the outer surface of the valve inlet and internal threads on the inner surface of the valve outlet. Mud saver valve 34 is connected to tool 46 by threadedly connecting the body extension 36 on mud saver valve 34 to the inlet of the outlet of the lower body 31. In so doing, the body extension and a portion of lower body 31 define the housing and annular space for mud saver valve 34 internals. A body seal 36a comprising an O-ring is disposed within a channel formed in the outer surface of the upper end of the body extension 36 to seal against the inner surface of the lower body 31 outlet and the pressurized fluid from leaking at the connection. Beginning with the mud saver valve 34 internals at the outlet portion, a choke 37 is connected to a choke extension 38 for regulating the flow of fluid from tool 46. Choke extension 38 and body extension 36 are adapted to retain a plunger spring 39 within the space defined by a portion of the inner surface of body extension 36 and the outer surface of choke extension 38. A plunger 40 having a central axial bore is connected to the upper end of choke extension 40. Plunger 40 includes a centrally located protruding annular ring portion 41, which is in slidable engaging contact with the inner surface of a valve housing 42. A plunger seal 40a comprising an O-ring is disposed within a channel formed in the annular ring portion 41 to provide a leak tight seal against valve housing 42. The upper end of plunger 40 includes a plurality of apertures 40b to allow fluid to flow into the bore of plunger 40 and out of choke 37. A plunger tip 40c is adapted to provide a fluid tight seal against plunger seat 43a. Plunger spring 39 biases plunger 40 thereby exerting an upward force on the choke extension 38 and therefore plunger 40 so that plunger tip 40c engages with and provides a fluid tight seal against the plunger seat 43a. Fluid pressure exerted on plunger tip 40c will cause plunger spring 39 to depress, which creates an opening allowing fluid to flow through mud saver valve 34, through nozzle 35 and into casing 32. The valve housing 42 is disposed between and is in engaging contact with the plunger 40 and the lower body 31. A housing seal 42a comprising an O-ring is disposed within a channel formed in the outer surface of valve housing 42 to provide a leak tight seal against lower body 31. A seat ring 43 having a central axial bore is in engaging contact with and disposed within the uppermost interior portion of lower body 31 and is in engaging contact with valve housing 43 and upper body 37. A lower body seal 31a comprising an O-ring is disposed within a channel formed in the lower body 31 to provide a leak tight seal against the seat ring 43. The outlet of a centrally located bore within seat ring 43 defines the plunger seat 43a. The plunger seat 43a is adapted to sealingly receive plunger tip 40c. The seat ring 43 further includes a plurality of spring loaded check valves 44 housed within vertical cavities 43b. An aperture 43c extends from each of the cavities 43b to provide fluid communication between the seal ring bore and cavities 43b. When the pressure below the seat ring 43 exceeds the pressure above seat ring 43, fluid will depressure through the check valves 44 and apertures 45 until an equilibrium pressure above and below the seat ring 43 is achieved. The check valves 44 therefore function as safety relief valves to ensure that high pressure fluid is not trapped below the tool, which could result in tool 46 being expelled uncontrollably from casing 32 as it is removed, or in an uncontrolled pressurized flow of fluid from casing 32 when the tool is removed. It will be obvious to one skilled in the art that the uncontrolled depressurization of fluid could result in significant downtime due to loss of fluid, damage to equipment, and injury to personnel.

Mud saver valve 34 also functions as a check valve to actuate open when the fluid pressure reaches a set point pressure of about 300 psig, for example. As the fluid pressure increases above 300 psig, plunger 40 is depressed against spring 39 which unseats plunger 40 from plunger seat 43a, which allows fluid to flow through tool 46 and into casing 32. When fluid pressure falls below about 300 psig plunger spring 39 biases plunger 40 upward causing plunger tip 40c to seat against seat ring 43. Thus, mud saver valve 34 retains fluid that would otherwise be drained and wasted from tool 46. The nozzle 35 is connected to the outlet of the mud saver valve 34. Nozzle 35 is generally conical to facilitate insertion into the casing, and includes an aperture 35a, all of which allow fluid to escape from tool 46 in a substantially laminar flow regime. Several mud saver valve 34 and nozzle 35 configurations are contemplated by the present invention. For example, a hose can be connected between mud saver valve 34 and nozzle 35, or a hose may be connected between lower body 31 and mud saver valve 34.

To begin the fluid filling process, fill-up and circulating tool 46 is lowered over casing 32 to be filled. Only the portion of tool 46 below packer cup 29 is inserted into casing 32. Sealing device 29 remains above and outside of casing 32 during the fill-up process. Fill-up of fluid is accomplished by simply activating the pump 8 to fill and then deactivating the pump 8 on completion. As the fluid pressure increases within tool 46, mud saver valve plunger 40 is unseated from plunger seat 43*a* and fluid is allowed to flow through fill-up and circulating tool 46 and into casing 32 to be filled.

Figure 4:
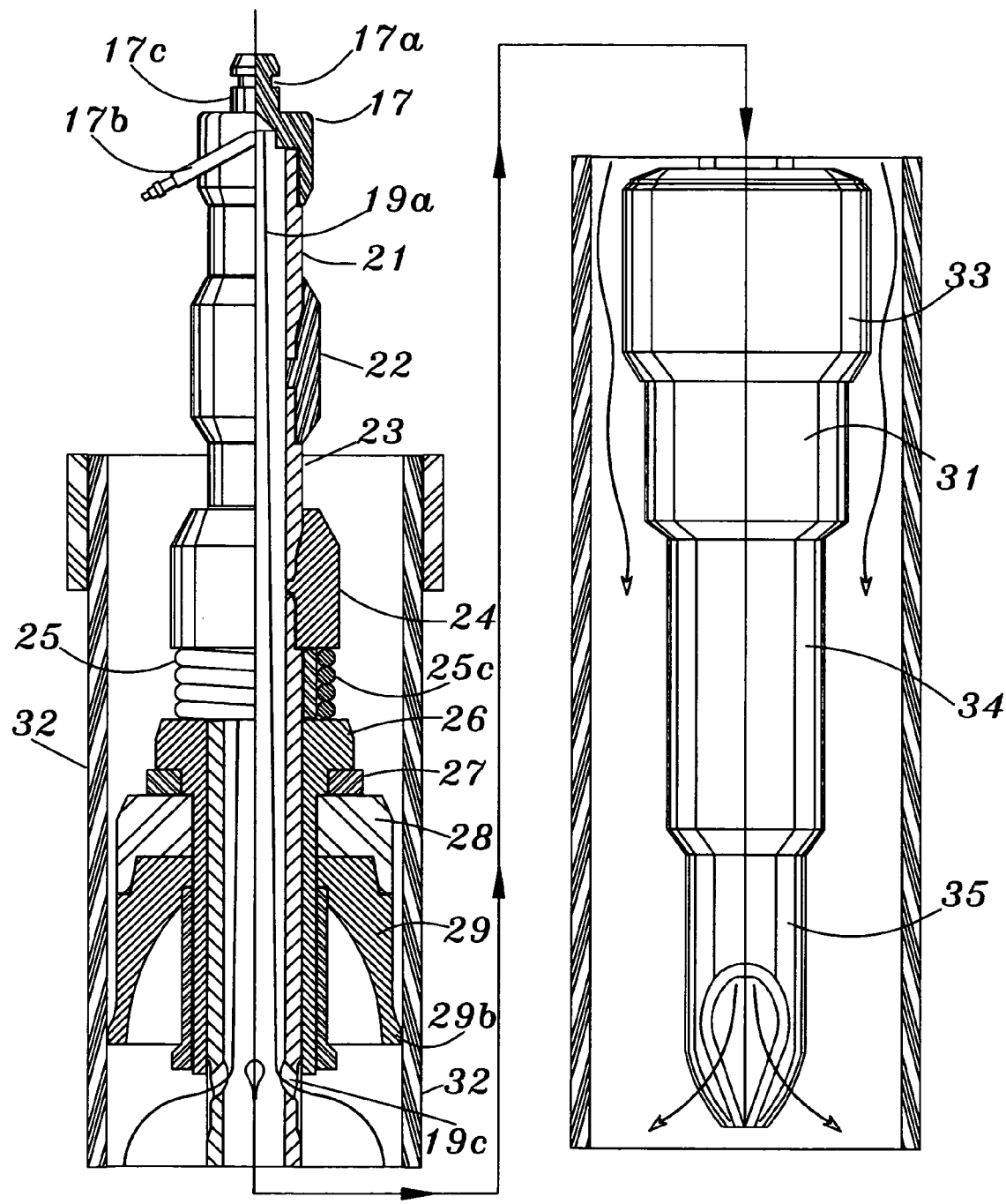
FIG. 4 Shows a side view of the fill up and circulating tool in the fill-up mode and configured for a conventional rotary rig assembly.

FIG. 4 shows the preferred embodiment of fill-up and circulating tool 46 in the rotary type configuration. FIG. 4 shows a bayonet adapter 17 connected to the first spacer 21 in place of the top sub 20 on the top sub assembly. If the top sub assembly is not needed, the bayonet adapter 17 may be connected directly to mandrel 19. The bayonet adapter 17 includes a fluid hose connection 17*b*, adapted to connect to the fluid hose 4, and a cylindrical post 17*c* extending from the top of the bayonet adapter 17. The outside diameter of the post 17*c* is slightly smaller than the inside diameter of the lock block so that post 17*c* may be inserted within the bore of the lock block 18. The outer surface of the upper end of post 17 includes channel for receiving a spring pin, which allows fill-up and circulation tool 46 to be suspended in the rotary rig configuration.

FIG. 4 also shows fill-up and circulating tool 46 in the fluid circulation mode. Fill-up and circulating tool 46, in the rotary rig configuration, is shown lowered into casing 32 such that sealing element 29 is in sealing engaging contact with the inside diameter of casing 32. Flow of fluid from pump 8 will cause the fluid pressure to build up inside of casing 32 until the hydrostatic pressure is overcome thereby resulting in the desired circulation of fluid from inside casing 32 into the wellbore 12. Packer cup 29 automatically engages against the inside diameter of casing 32 as it is lowered therein. Therefore, when circulating fluid is desired (e.g. when the casing is stuck in the wellbore 12), further downward force is exerted on tool 46 by lowering the assembly from traveling block 1. This causes spring 25 disposed about the exterior of mandrel 19 to become compressed between top collar 24 and flange portion 26*a* (FIG. 3) on the sliding sleeve 26. The downward force causes mandrel 19 to move vertically downward with respect to sliding sleeve 26 thereby exposing the lower end of mandrel 19 and apertures 19*c* formed therethrough. Pressurized fluid from the fluid pump 8 may now follow the flow path 19*a* through tool 46 as well as through the apertures 19*c* into the casing 32. As casing string 32 is filled, the fluid pressure inside of the casing increases, which further engages packer cup 29 against the inside surface of casing 32. When circulating is no longer necessary, pump 8 is simply stopped. This results in plunger 40 within mud saver valve 34 re-seating against plunger seat 43*a*, which stops the flow of fluid through nozzle 35. Tool 46 is then withdrawn from casing 32 by raising the assembly suspended from traveling block 1 so that the next joint of casing 32 can be picked up or to prepare tool 46 for cementing operations.

Figure 5:
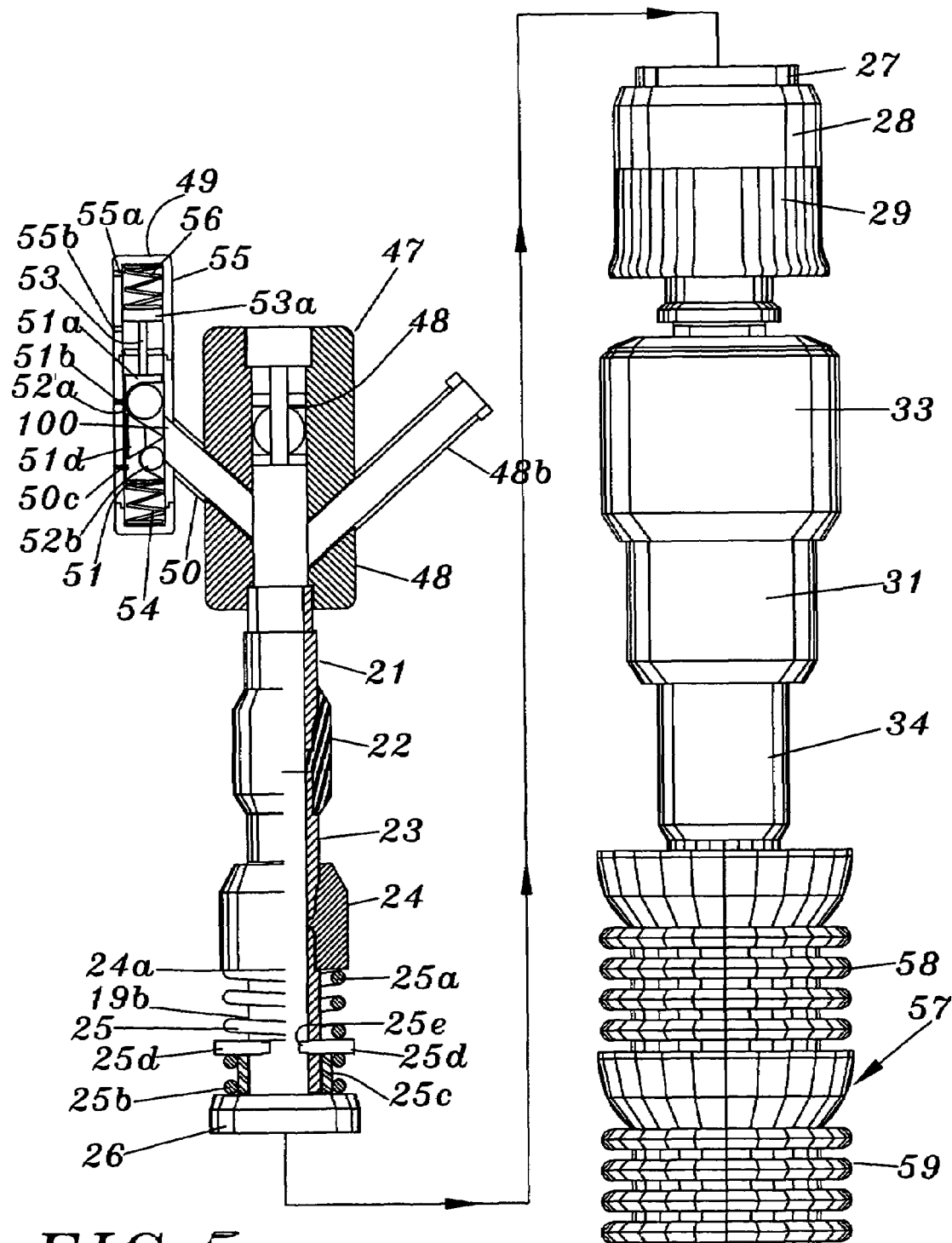
FIG. 5 Shows a side view of the fill up and circulating tool in the cementing mode and configured for a top drive rig assembly.

FIG. 5 illustrates fill-up and circulating tool 46 in the cementing configuration. While FIG. 5 shows the preferred embodiment of fill-up and circulating tool 46 as shown in FIGS. 3, 4 and 7-9, the present invention contemplates and includes fill-up and circulating tools of other embodiments. Thus, the following discussion addresses wherein fill-up and circulating tool 46 is referenced for illustrative purposes. Further, this configuration may be utilized in either the top drive rig or conventional rotary rig operations. Any fill-up and circulating tool capable of insertion into casing may be quickly and easily switched from a drilling fluid filling and circulating mode of operation to the cementing configuration as shown in FIG. 5 by combining the selected fill-up and circulating tool with cementing head assembly 47 and wiper plug assembly 57 of the present invention. The fill-up and circulating tool, in the cementing configuration, is connected to and therefore extends the flow path from a cementing head assembly 47 to a wiper plug assembly 57. Using fill-up and circulating tool 46 as more fully described above, the cementing configuration comprises a cementing head assembly 47 connected to first spacer 21 of the top sub assembly, and a cement wiper plug assembly 57 in place of mud saver valve 34 and nozzle 35. Since the present invention contemplates and includes fill-up and circulating tools of various other embodiments, other means of attachment to a top drive or conventional rotary type units are contemplated as required by the particular fill-up and circulating tool used in the cementing configuration. Additionally, cementing head assembly 47 may be directly connected to fill-up and circulating tool 46.

The preferred embodiment of cement head assembly 47 includes a ball drop coupling 48, a ball carrier assembly 49, and a ball port 50 connecting ball drop coupling 48 to ball carrier assembly 49 providing a passageway therebetween. Ball carrier assembly 49 includes a ball carrier mandrel 50, which houses a ball carrier 51 in slidable engagement with the interior surface of the ball carrier mandrel 50. The lower surface of the ball carrier 51 includes a slot (not shown) within which ball stops 51*b* and 51*c* are disposed. Ball carrier 51*a* further includes a large ball seat and a small ball seat within which a large ball 52*a* and a small ball 52*b* are respectively seated. Slidably disposed between large ball seat and small ball seat within slot the ball carrier 51 is ejector 51*d*. Attached to an upper surface of ball carrier 51*a* is plunger 53 which extends through an aperture in the upper end of ball carrier mandrel 51. Disposed between a lower interior surface of ball carrier mandrel 51 and a lower surface of ball carrier 51*a* is ball spring 54. Threadedly connected to the upper end of ball carrier mandrel 51 is a pressure housing 55. Pressure housing 55 houses an upper end of plunger 53 and a plunger spring 56. Plunger spring 56 is disposed between a top surface of plunger head 53*a* and an inside surface on the top of pressure housing 55. Plunger spring 56 biases plunger 53 against the biasing force applied by ball spring 54 so that neutral position, designated by line 100, ball carrier 51 is in a position that prevents the release of either of the balls 52*a* and 52*b* through ball port 50 and into ball drop coupling 48. Pressure housing 55 also includes pressure ports 55*a* and 55*b* through which a pressurization fluid (either gas, e.g. air, or hydraulic fluid) is delivered into pressure housing 55. In the preferred embodiment the fluid pressure is supplied by air. Thus, cement head assembly 47 may be actuated remotely to release the appropriate ball using fluid pressure. To release large ball 52*a*, air pressure in the range of 90-120 psi is delivered to pressure port 55*a*. The fluid pressure forces plunger 53 and ball carrier 51 down to a position such that the movement of ejector 51*d* within the ball carrier slot stops on contact with stop 51*b*, the contact of which results in large ball 52*a* being ejected through ball port 50 and descends into ball drop coupling 48. Pressure housing 55 may be depressurized, which allows the spring biasing forces to overcome the fluid pressure, returning ball carrier 51 to neutral position 100. To eject small ball 52*b*, air pressure is delivered to pressure port 55*b*. The fluid pressure forces plunger 53 and ball carrier 51*a* upward to a position such that the movement of ejector 51*d* within the ball carrier slot stops on contact with stop 51*c* the contact of which results in small ball 52*b* being ejected through ball port 50 and descends into ball drop coupling 48. Again, pressure housing 55 may be depressurized, which allows the spring biasing forces to overcome the fluid pressure returning ball carrier 51 to neutral position 100.

If fill-up and circulating tool 46 (of FIG. 3a or 4) is installed with cementing head assembly 47 and wiper plug assembly 57, it is preferable to keep cement from flowing through mandrel apertures 19c. If cement is allowed to flow through mandrel apertures 19c, plugging of the apertures as well as erosion may occur. To prevent this, sliding sleeve 26 must be fixed in place on fill-up and circulating tool 46 of the present invention so that mandrel apertures 19c remain covered during the cementing operation. To accomplish this, a set screw 25d is disposed within each of a plurality of threaded set screw apertures 25b in the outer surface 19b of mandrel 19 near mandrel outlet . Preferably apertures 25b are located a minimal distance above spring stop 25c to fix sliding sleeve 26 in a position to cover mandrel apertures 19c during the cementing operations. Thus cement will not flow from mandrel 19 through mandrel apertures 19c. It is therefore desirable for the full flow of cement to follow flow path 19a so as to ensure proper operation of the ball dropping function, and to prevent plugging or erosion of mandrel apertures 19c. One who is skilled in the art will readily perceive other methods for preventing sliding sleeve 26 from moving upward to expose mandrel apertures 19c. For example, a tubular member may be disposed about spring 25 between top collar 24 and sliding sleeve 26 to fix sliding sleeve 26 in place.

After the casing string has been run, it must be cemented within wellbore 12. After the last casing joint has been filled with drilling fluid, a volume of water or flushing fluid is pumped through the assembly and into the casing. The assembly is then removed from the casing string to be configured for the cementing mode. The fill-up and circulating tool is then uncoupled from the top drive or rotary drive unit. The cementing head assembly 47 is coupled to the inlet of the tool. In the alternative, the cementing head assembly 47 may be pre-installed with the fill-up and circulating tool for operation in both the drilling fluid and cementing mode. The next step is to connect wiper plus assembly 57 to lower body 31 on fill-up and circulating tool 46. First, mud saver valve 34, and nozzle 35 are removed from fill-up and circulating tool 46. The wiper plug assembly 57 is then installed. The wiper plug assembly 57 comprises a top wiper plug 58 detachably connected to a bottom wiper plug 59. The fill-up and circulating tool is now in the cementing configuration and is then reconnected to the top drive or rotary unit. The next step is to release bottom plug 59 from wiper plug assembly 47. To release bottom plug 59, the first of two tripping balls 52a must be released from tripping ball chamber 50. To release tripping ball 52a, pin 50c is retracted, which allows ball 52a to descend from tripping ball chamber 49 and through tool 46. The first tripping ball 52a severs the connection between two wiper plugs 58 and 59, which causes bottom wiper plug 59 to drop into casing string 32. A calculated volume of cement is then pumped through the tool and assembly, which drives bottom wiper plug 59 down casing string 32. As bottom wiper plug 59 descends the casing string, it wipes mud off the inside diameter of the casing. The cement drives bottom wiper plug 59 to engage with the float collar (not shown) at the bottom of casing 32. After the calculated volume of cement has been pumped, a second tripping ball 52b is released from ball dropping pump-in tee 49. The second tripping ball severs top plug 58 from wiper plug assembly 57 and descends into the casing string. Top plug 58 is driven down casing 32 by pumping drilling fluid or other suitable fluid through inlet port 48b behind top plug 58, which also wipes the cement off the inside of casing 32. When sufficient pressure is generated between the two wiper plugs 58 and 59, a diaphragm in bottom wiper plug 59 is ruptured, which allows the cement between wiper plugs 58 and 59 to flow from inside casing 32 through bottom wiper plug 59 and into the annulus between casing 32 and wellbore 12. After top plug 58 has come to rest by engaging against bottom plug 59, the discharge pressure on pump 9 begins to increase, which indicates that casing 32 has been successfully sealed off from the annulus between casing 32 and wellbore 12.

The fill-up and circulation tool of the present invention may readily be used in a tandem configuration. The tandem configuration is used when it is desired to run two different diameter casing strings, and has the advantage of eliminating the downtime required to rig up prior art circulation tools. The tandem configuration embodiment comprises the fill-up and circulation tool as described above, however, it includes a second sliding sleeve and packer cup arrangement connected above the first sliding sleeve and packer cup wherein the diameter of the second packer cup 29 is larger than first packer cup 29. This allows for both the larger and smaller diameter casing to be filled and circulated without re-tooling. This arrangement can also be used with other sealing elements such as inflatable packers, and devices that seal against the casing via and interference or friction fit with the casing.

Figure 6:
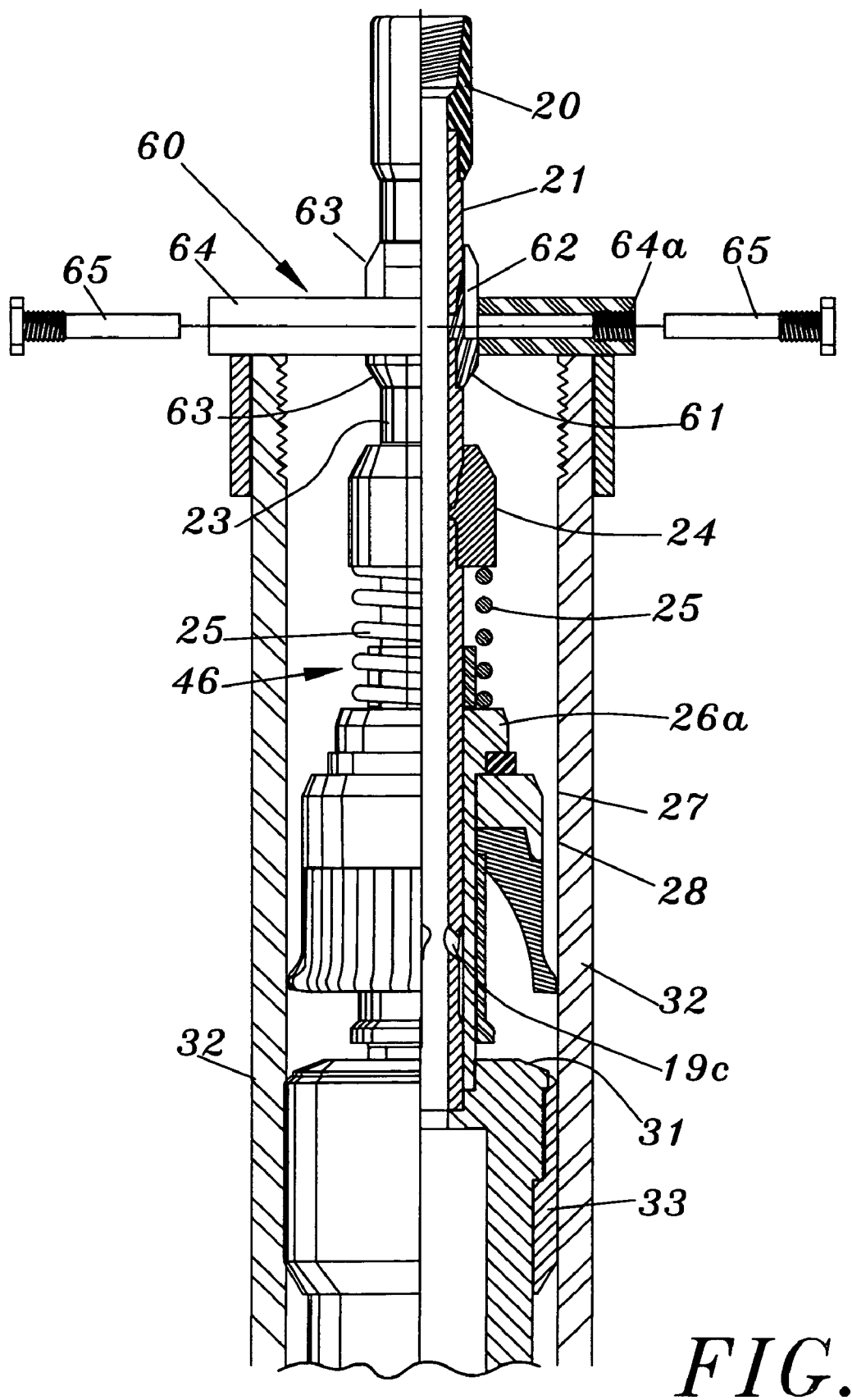
FIG. 6 Shows a side view of the fill up and circulating tool configured with the push plate assembly.

FIG. 6 is illustrative of a push plate assembly 60. During casing operations, it may be necessary to apply a downward force to push casing 32 into the wellbore. This feature allows the weight of the rig assembly to be applied to the top of the casing through push plate assembly 60. While FIG. 6 shows the preferred embodiment of fill-up and circulating tool 46 as shown in FIG. 3, the present invention contemplates and includes fill-up and circulating tools of other embodiments, including but not limited to those shown in the following figures. Thus, the discussion which follows whereby fill-up and circulating tool 46 referenced is for illustrative purposes. Further, this configuration may be utilized in either the top drive rig or conventional rotary rig assemblies. The push plate assembly 60 is located between top collar 24 and top sub 20 on fill-up and circulating tool 46, and is installed in place of the standard connector coupling 22. The push plate assembly 60 includes a coupling 61 with a plurality of J-shaped slots 62 within outer wall 63 of coupling 61. A rotatable plate 64 is radially disposed about coupling 61 and is adapted to be fixed about coupling 61 with plurality of pins 65.

To add load to the casing string, plate 64 must first be rotated until pin 65 is engaged within the horizontal portion of J-shaped slot 62. This locks plate 64 within assembly 60 so that load may then be transferred to the casing string. Spider 10 is then engaged against casing 32 to hold the string in place. Elevator 14 is then released from casing 32 above the rig floor. The top drive unit 3 is then lowered by traveling block 1 until plate 64 is in contact with the top of the casing string. Elevator 14 is then attached to casing 32, and spider 10 is released. The casing 32 is now being held only by elevator 14. Further lowering of top drive unit 3, adds load (the weight of the rig) to casing string, forcing the string into wellbore 12. To disengage and release the load from the rig, spider 10 is set against casing 32 to hold the casing string. Traveling block 1 is then raised about 6 inches to pick up on top drive unit 3 enough to disengage plate 64 from the top of casing 32. Plate 64 is then rotated so that pins 65 are aligned with the vertical portion of the J-shaped slot 62. Traveling block 1 is then lowered about 6 inches to push down on top drive unit 3 enough to allow elevator 14 to be released from casing string 32. The assembly can now be positioned to receive the next joint of casing 32 to be added to the string.

Figure 7:
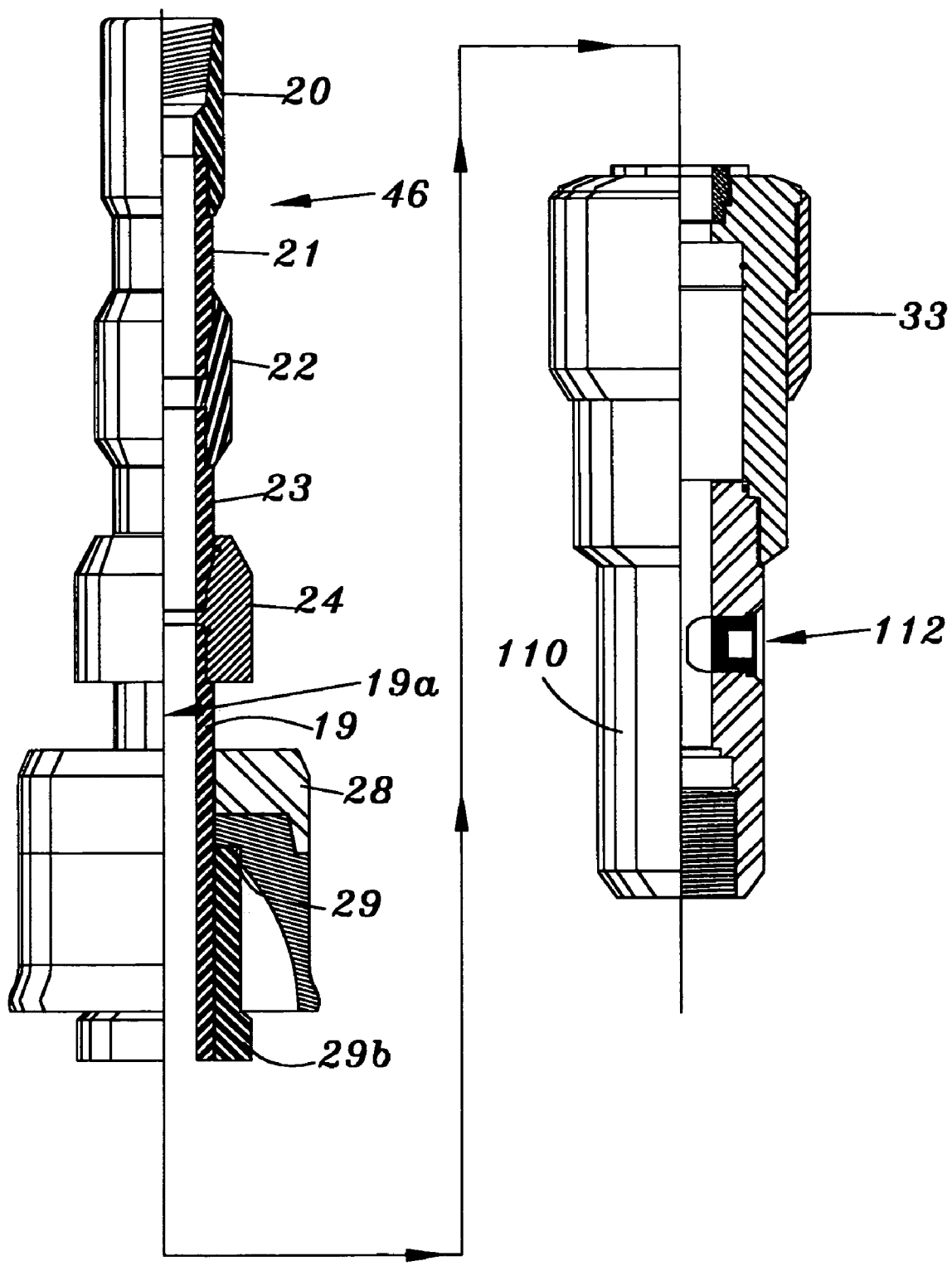
FIG. 7 Is a partial, cross-sectional view of another embodiment of a fill up and circulating tool having a pressure relief housing.

FIG. 7 is a partial cross-sectional view of another embodiment of fill-up and circulating tool 46 of the present invention. Tool 46 includes a mandrel 19 having a bore 19a formed therethrough in fluid communication between a top and bottom end, the top end being adapted for connecting to a top sub assembly for connecting to a rotary or top drive as commonly known in the art and as shown in previous embodiments. Cementing apparatus 47, 49 and 50 may also be connected with tool 46 of the present invention as shown in FIG. 5. Tool 46 further includes a thimble 28 and a sealing element 29 connected about mandrel 19 for sealing annulus between casing 32 and tool 46 when tool 46 is in the circulating or cementing mode. Tool 46 further includes a pressure relief housing 110 connected to mandrel 19 having a fluid pathway formed therethrough and in fluid connection and continuing fluid pathway 19a of tool 46. Pressure relief housing 110 forms at least one lateral aperture or port 112 which provides a fluid pathway in communication with the mandrel pathway 19a for preventing flow from pathway 19a into casing 32 while allowing fluid flow from said casing 32 through aperture 112 into pathway 19a when pressure in casing 32 is greater then the pressure within tool 46 (pathway 19a). In a preferred embodiment a mud saver valve 34 and nozzle 35 are connected below pressure relief housing 110.

Figure 8:
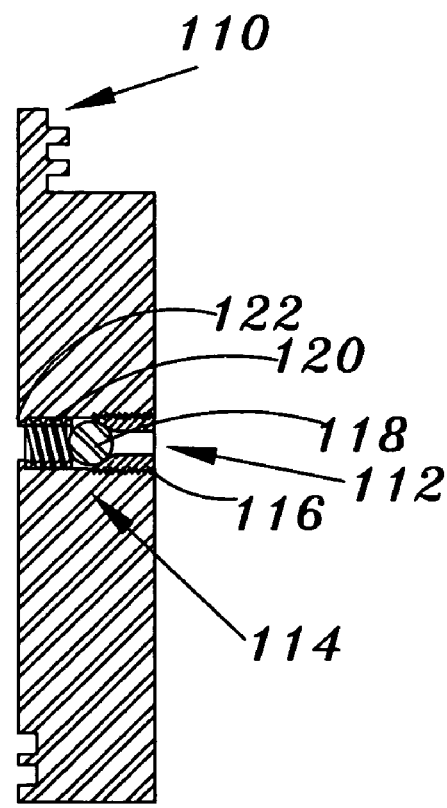
FIG. 8 Is a partial, cross-sectional view of the pressure relief housing of FIG. 7.

FIG. 8 is a cross-sectional view of pressure relief housing 110. As shown, relief housing 110 is adapted for threadedly connecting to tool assembly 46, however, relief housing 110 may be welded or be a unitary section of mandrel 19. Formed laterally through housing 110 is an aperture 112 for allowing fluid to flow into flow pathway 19a. A blocking mechanism 114 is in working connection with housing 110 to prevent fluid from flowing from pathway 19a through lateral aperture 112 into the casing.

Blocking mechanism 114 as shown in FIG. 8 is a back seat check valve assembly having a plug and seat 116 forming a pathway therethrough, a ball 118, and a spring 120. Housing section 110 forms a lip 122 adjacent the inner opening of aperture 112. Disposed inside of aperture 112 and against lip 122 is spring 120 for biasing ball 118 away from pathway 19a and against plug and seat 116. As shown in this embodiment, plug and seat 116 is threadedly connected within aperture 112 for easy removal in order to replace ball 118 and spring 120 when needed. Although plug and seat 116 is shown threadedly connected to housing section 110 other modes of connecting to may be utilized such as set screws. It is also contemplated that ball 118, spring 120, and plug and seat 116 be constructed as a single assembly.

With reference to FIGS. 1-8, when the well is in a static condition and pressure inside of casing 32 is substantially equal to or less then the pressure within tool within pathway 19a, ball 118 is seated against plug and seat 118 preventing fluid flow from inside the casing through port 112 back into housing 110. When pressure inside casing 32 is greater then the pressure in pathway 19a, ball 118 is unseated from plug and seat 116, allowing fluid to enter pathway 19a through port 112 thereby relieving pressure within casing 32. For example, when tool 46 is in the circulating mode, sealing element 29 is engagingly disposed within casing 32. Fluid is pumped through tool 46 and ball 118 is seated against plug and seat 116 preventing fluid flow through port 112. When pump 8 or 9 is shut down fluid is allowed to flow from casing 32 through port 112 into pathway 19a and past sealing element 29. In this manner, pressure is equalized across sealing element 29 allowing tool 46a to be removed from casing 32.

Figure 9:
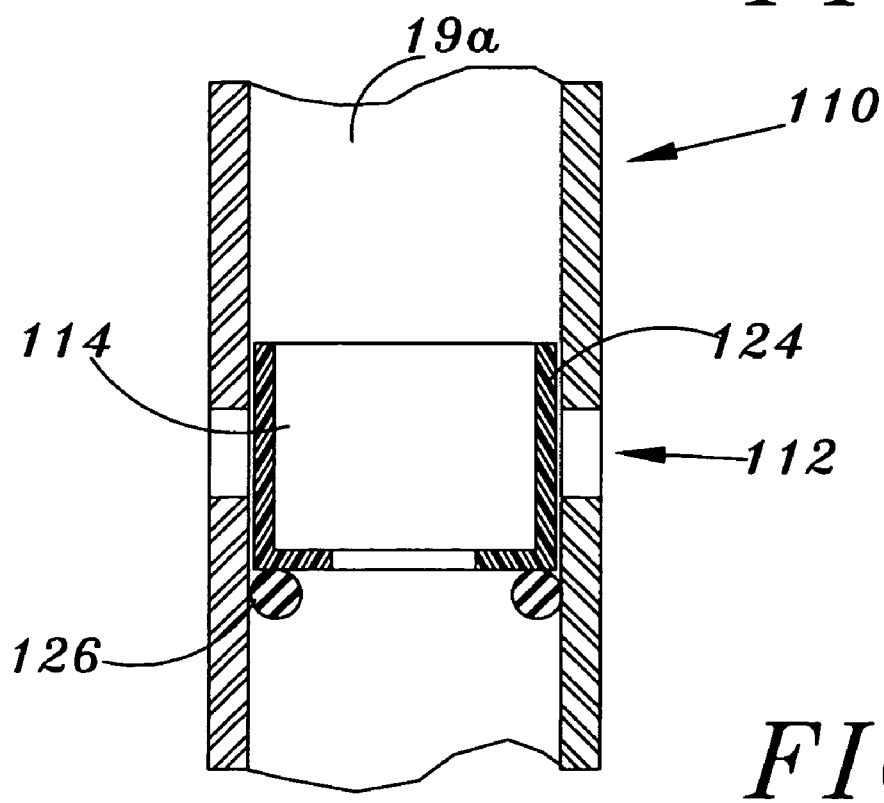
FIG. 9 Is a partial, cross-sectional view of the pressure relief housing of FIG. 7.

FIG. 9 is a partial, cross-sectional view of another embodiment of pressure relief housing 110. As blocking mechanism 114, includes an elastomer member 124 for preventing fluid from pathway 19a through port 112 into the casing when pressure is greater in pathway 19a then in the casing. As shown, elastomer member 124 is an inverted packer cup disposed within pathway 19a and across port 112. Member 124 is held in place by a locking ring 126 connected to the interior of housing 110. Many versions of this embodiment are anticipated such as, inversion of a packer cup such as the one shown, an elastomeric flapper attached across port 12, use of other deformable material which is biased across port 112 when pressure in pathway 19a is greater then the pressure in casing 32.

In addition it is anticipated that housing 112 as shown in FIGS. 7-9 may include a port 112 but not have a blocking mechanism. In this embodiment, fluid may be pumped through tool 46 and through port 112. When pumps 8 or 9 are shut off, fluid and pressure is allowed to bypass valve 34 and enter tool 46 through port 112 and relieve the pressure below sealing element 29.

Those who are skilled in the art will readily perceive how to modify the present invention still further. For example, many connections illustrated have been shown as threaded, however, it should be understood that any coupling means (threads, welding, O-ring, etc.) Which provides a leak tight connection may be used without varying from the subject matter of the invention disclosed herein. In addition, the subject matter of the present invention would not be considered limited to a particular material of construction. Therefore, many materials of construction are contemplated by the present invention including but not limited to metals, fiberglass, plastics as well as combinations and variations thereof. As many possible embodiments may be made of the present invention without departing from the scope thereof, it is to be understood that all matter herein set forth or shown in the accompanying drawings is to be interpreted as illustrative and not in a limiting sense. Accordingly, the foregoing description should also be regarded as only illustrative of the invention, whose full scope is measured by the following claims.

What is claimed is:

1. A push plate assembly for attachment to a fill-up and circulation tool for pushing a casing string downward into a well bore during a process of inserting said casing string within said well bore for use on top drive and rotary type drilling rigs, said casing string being comprised of a plurality of casing tubulars for interconnection and insertion into said well bore, said fill-up and circulation tool comprising a tubular member with a flexible seal thereon insertable into said plurality of casing tubulars for sealing contact with an interior of said casing tubulars, the push plate assembly comprising:
   a top sub portion, with a top and bottom end, the top end connecting to the rig;
   a coupling connected to said bottom end of the top sub portion; and
   a rotatable plate radially disposed about said coupling, said rotatable plate capable of being fixedly attached to said coupling, wherein load forces from the rig are transferred through the rotatable plate, when fixedly attached to said coupling, to the casing to push the casing downward into the well bore.

2. The push plate assembly of claim 1, wherein said coupling further comprises an outer wall and a plurality of J-shaped slots within the outer wall of said coupling.

3. The push plate assembly of claim 1, wherein the rotatable plate is fixedly attached about said coupling with a plurality of pins.

4. A method of pushing a casing tubular utilized to form a casing string downward into a well bore during a process of inserting said casing string within said well bore for use on top drive and rotary type drilling rigs, said casing string being comprised of a plurality of casing tubulars for interconnection and insertion into said well bore, said method comprising:
- providing a top sub portion, with a top and bottom end, the top end connecting to the rig;
- providing a coupling connected to said bottom end of the top sub portion;
- providing a rotatable plate radially disposed about said coupling;
- engaging said rotatable plate to said coupling;
- fixedly attaching said rotatable plate and said coupling in said engaged position; and
- transferring load forces from the rig, through the rotatable plate, to the casing to push the casing downward into the well bore.

5. The method of claim 4, further comprising rotating said rotatable plate to engage said rotatable plate to said coupling.

6. The method of claim 5, further comprising the steps of:
- moving said rotatable plate downward to contact said casing; and
- transferring said rig loading forces through the plate to the casing.

7. The method of claim 6, further comprising the step of lowering the rig drive unit for said loading force transfer.

8. A push plate assembly for attachment to a fill-up and circulation tool for pushing a tubular string into a well bore comprising:
- a top sub portion, with a top and bottom end, the top end connecting to a rig;
- a coupling connected to said bottom end of the top sub portion; and
- a rotatable plate radially disposed about said coupling, said rotatable plate capable of being fixedly attached to said coupling, wherein load forces, from the rig, are transferred through the rotatable plate, when fixedly attached to said coupling, to the tubular string to push the tubular string downward into the well bore.

* * * * *